UNITED STATES PATENT OFFICE.

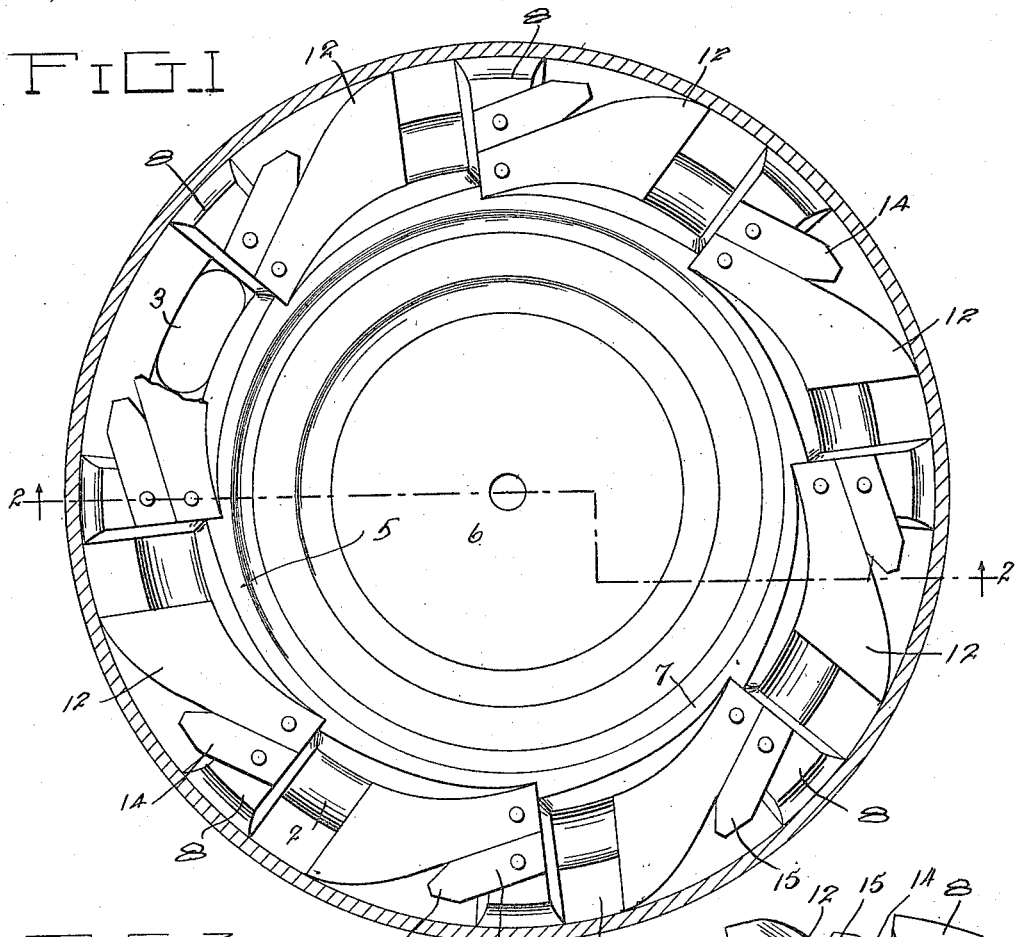

ALBERT N. GRINSTEAD, OF ROYSTON, TEXAS, ASSIGNOR OF ONE-HALF TO J. R. WATTS, OF ROYSTON, TEXAS.

SEED-DROPPING PLATE.

1,169,636.   Specification of Letters Patent.   Patented Jan. 25, 1916.

Application filed July 16, 1915. Serial No. 40,298.

*To all whom it may concern:*

Be it known that I, ALBERT N. GRINSTEAD, a citizen of the United States, residing at Royston, in the county of Fisher and State of Texas, have invented certain new and useful Improvements in Seed-Dropping Plates; and I do hereby declare the following to be a full, clear, and exact description of the invention, such as will enable others skilled in the art to which it appertains to make and use the same.

This invention relates to seed dropping plates for use in connection with various types of planters, and the primary object of the invention is to provide a seed dropping plate for dropping or planting peanuts, which has means for dropping a single peanut at a time, and means for retaining the peanuts during the rotation of the plates for preventing them from clogging the operation of the planter and dropping openings.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved seed dropping plate, Fig. 2 is a cross sectional view on the line 2—2 of Fig. 1, Fig. 3 is a fragmentary perspective view of a part of the seed dropping plate, and Fig. 4 is a fragmentary bottom plan view of a part of the seed dropping plate.

Referring more particularly to the drawings, 1 designates the bottom plate, which may be mounted in any suitable type of seed retaining hopper, carried by any suitable type of planter. The plate 1 is constructed of a circular ring, which is provided with an annular groove 2 formed in its upper surface, adjacent its inner edge. The plate or ring 1 is provided with an opening 3 extending therethrough, and communicating with the annular groove 2, which opening is provided for permitting of the dropping of the peanuts.

A seed or peanut conveying plate or structure 5 is provided, which comprises a plate 6, which extends through the opening formed centrally within the ring 1. The plate 6 has an opening 7 extending centrally therethrough, by means of which the plate may be attached to the propelling or rotating means of the planter.

The plate 6 has an upstanding annular projection 7 formed about its outer edge, upon which projection are formed radially extending spaced peanut engaging fingers 8, which are provided with substantially semi-circular shaped recesses 9 formed in their under surfaces. The outer surface or side of the projection 7 is provided with a plurality of shoulders 10 formed thereon, which extend rearwardly from each of the radiating fingers 8, and incline downwardly toward the lower edge of the projection, forming a substantially triangularly shaped projection 11, upon the outer surface of the projection 7, rearwardly of each of the radiating fingers 8. The upper surface or shoulder 10 of the projection 11 forms a rest for a guiding plate 12, which plate is constructed of tin or analogous sheet metal, and is bent to form a groove 13, which leads toward the semi-circular recess 9 formed in the under surface of the finger 8 next to the one to which the plate 12 is attached. The plate 12 forms means for guiding the peanuts downwardly into the recesses 9 and the annular groove 2, where they are engaged by a spring 14. A spring 14 is secured to the upper surface of each of the fingers 8 and is bent downwardly so that its rear lower end, indicated at 15, will ride above the upper surface of the ring 1 and hold the peanuts within the recesses 9 and the annular groove 2, for preventing them from clogging the groove and interfering with the operation of the seed dropping plate.

In the operation of the improved seed dispensing plate: the peanuts, or like seed are deposited within the retaining hopper of the planter, and naturally fall to the bottom of the same, where they are guided by the guiding plate 12, downwardly into the recesses 9 and the groove 2. When a peanut is guided within one of the recesses 9, it is held therein, during the rotation of the plate 6, by the spring 14, which is attached to the corresponding finger, until the peanut is positioned over the opening 3, when it falls through the opening into the ground, which has previously been prepared for planting.

In reducing the invention to practice, certain minor features of construction, combination and arrangement of parts may necessitate alteration, to which the patentee is entitled, provided such alterations are comprehended within the scope of what is claimed.

What is claimed is:—

1. In a seed dropping mechanism, a planting plate including a bottom plate formed of a ring having an annular groove formed in its upper surface, said bottom plate being provided with an opening communicating with said groove, a rotary plate positioned interiorly of said ring, an upstanding circular projection formed upon said rotary plate, a plurality of radiating fingers formed upon said projection and extending over the upper surface of said bottom plate, said fingers being provided with recesses formed in their under surfaces communicating with said annular groove, means carried by said fingers for guiding a peanut into the groove formed in the under surface of the fingers next thereto, and means for retaining peanuts within said groove until they reach said opening.

2. In a seed dropping mechanism, a dropping plate structure including a bottom plate formed of a ring having an annular groove formed in its upper surface, said ring being provided with an opening communicating with said groove, a rotary plate positioned interiorly of said ring, an upstanding circular projection formed about the outer edge of said rotary plate, a plurality of radiating fingers formed upon said projection and overlying the upper surface of said ring, said fingers having recesses formed in their under surfaces, guiding plates secured to the upper surfaces of said fingers and extending rearwardly toward the finger next thereto, said guiding plates being curved for forming grooves for guiding a peanut into the recess of the finger next to the one to which it is attached, and a spring secured to each of said fingers for engaging a peanut and holding it within the recess formed in the finger until the peanut reaches said opening.

In testimony whereof I affix my signature in presence of two witnesses.

ALBERT N. GRINSTEAD.

Witnesses:
L. H. McCRUA,
NANNIE TOMPKINS.

Copies of this patent may be obtained for five cents each, by addressing the "Commissioner of Patents, Washington, D. C."